May 17, 1932. H. H. RAPLEY 1,858,416
CONVEYER
Filed Jan. 25, 1930 3 Sheets-Sheet 1

Inventor
Harold H. Rapley
By Frank A. Hubbard
Attorney

Patented May 17, 1932

1,858,416

UNITED STATES PATENT OFFICE

HAROLD HERBERT RAPLEY, OF BEDFORD, ENGLAND, ASSIGNOR TO CUTLER-HAMMER, INC., OF MILWAUKEE, WISCONSIN, A CORPORATION OF DELAWARE

CONVEYER

Application filed January 25, 1930, Serial No. 423,318, and in Great Britain March 8, 1929.

This invention relates to, and has for its object the provision of improvements in, conveyers of the kind in which articles are conveyed by endless belts.

The invention consists broadly in the arrangement according to which the conveyer is adapted to convey from a plurality of supply sources to a plurality of destinations, the arrangement being such that the articles may be conveyed either from the several sources to respective normally corresponding destinations simultaneously or from one source to a destination other than the normally corresponding one.

Thus in the case of a newspaper conveyer, if there are two presses and two delivery tables the conveyer may comprise two end conveyer sections and an intermediate conveyer section located between them, and the presses may be adapted to supply to the points between said intermediate section and said end sections, said end sections extending to the delivery tables; the conveyer will be capable of being set either for conveying simultaneously from both sources along the adjacent end sections or from conveying from one source along the intermediate section and the remote end section in series, the other source being out of operation.

Figure 1:
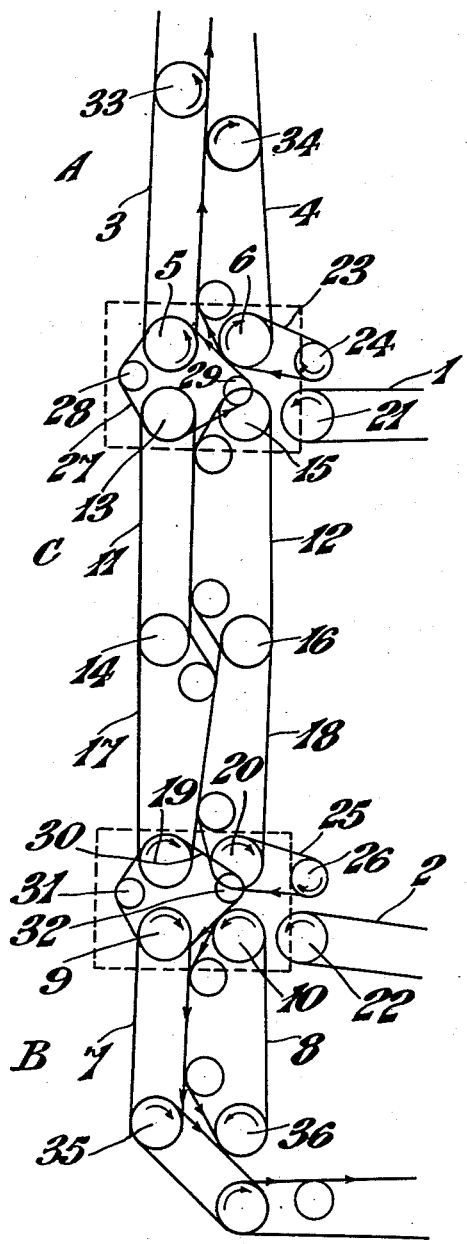
Figure 2:
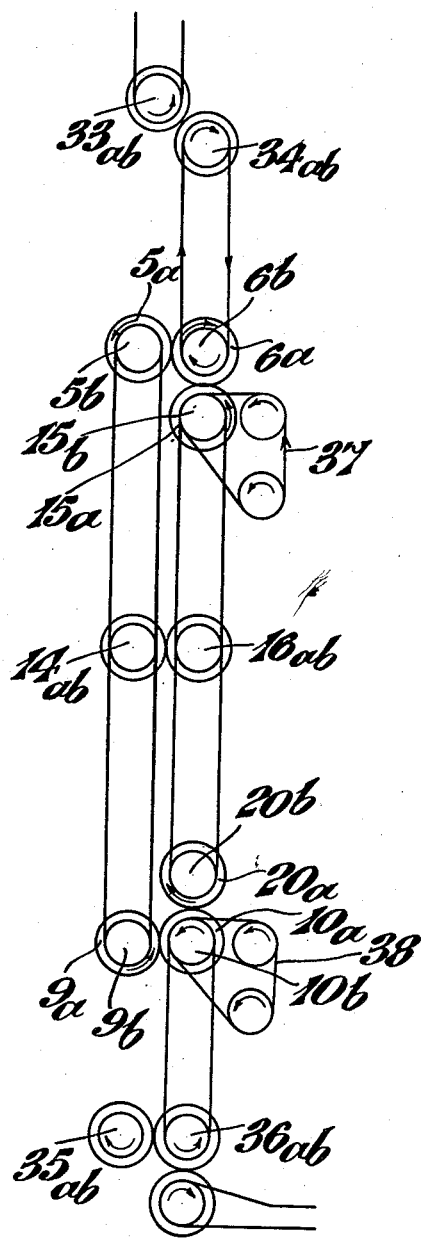
Figure 3:
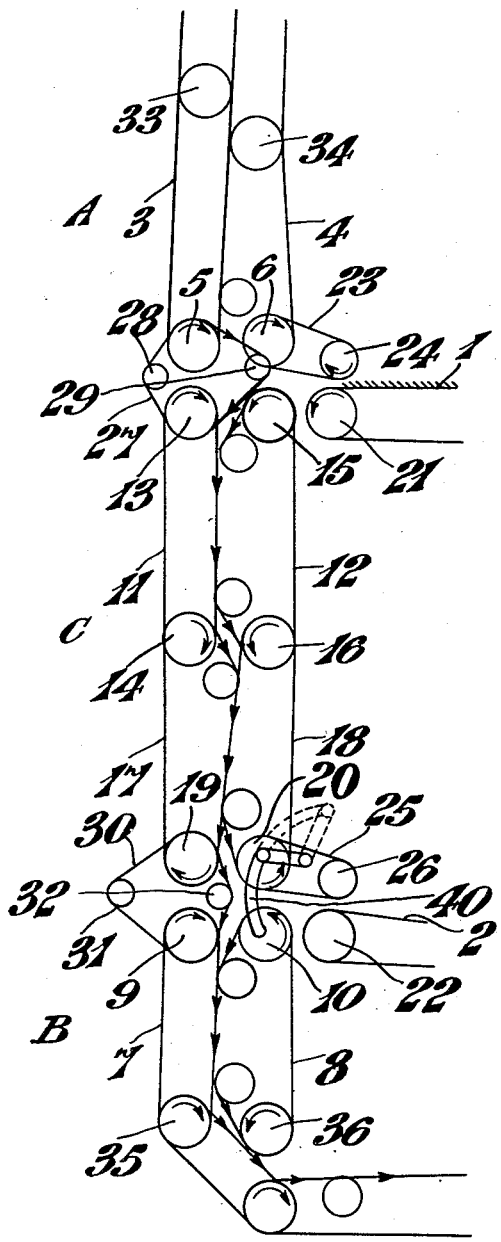
Figure 4:
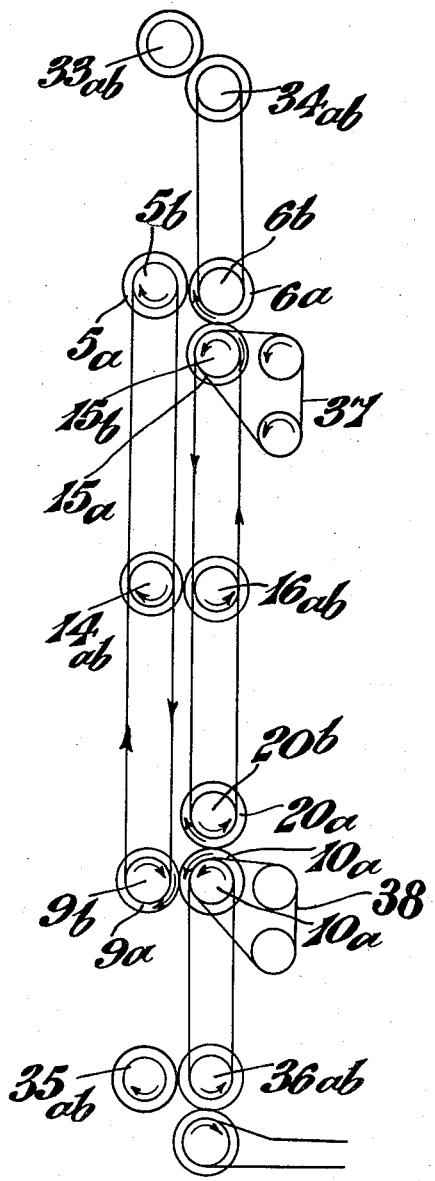
Figure 5:
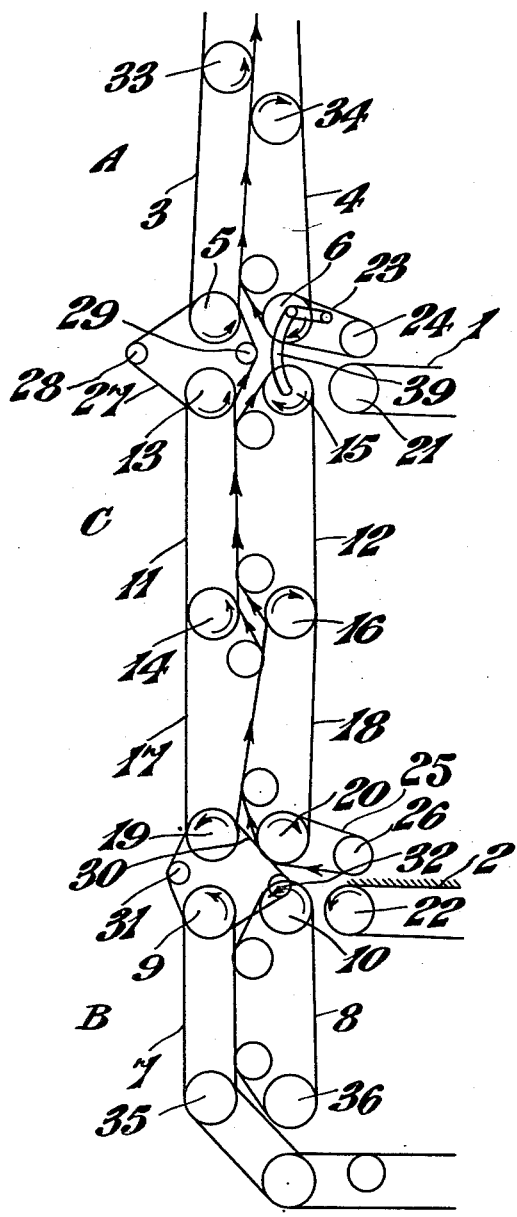
Figure 6:
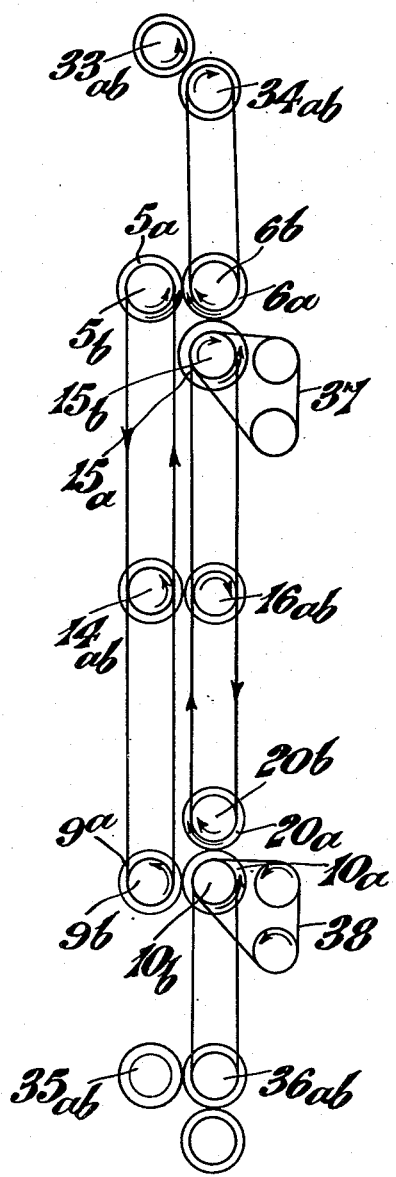

In order that the invention may be the more clearly understood a newspaper conveyer system in accordance therewith will now be described reference being made to the accompanying drawings wherein:

Figures 1, 3 and 5 are side elevational views of the conveyer proper illustrating respectively its three operative settings. Figures 2, 4 and 6 are corresponding views of the driving mechanism for said conveyer proper.

Referring to the drawings the conveyer comprises two end conveyer sections A and B and an intermediate section C. The conveyer is adapted to be supplied from two printing presses located one above the other by means of respective belts 1 and 2, the belt 1 being adapted to supply the conveyer at a point between sections A and C and the belt 2 at a point between sections B and C. The section A extends upwards to an upper delivery table, and the section B extends downwards to a lower delivery table. The conveyer has three operative settings—one, shown in Figures 1 and 2, at which papers are adapted to be delivered simultaneously from the upper and lower presses to the respective sections A and B whereby they are conveyed respectively to the upper and lower delivery tables. Next, shown in Figures 3 and 4, at which papers are adapted to be delivered from the upper press to the intermediate section C and thence to the lower section B and the lower delivery table; and thirdly, shown in Figures 5 and 6, at which papers are to be delivered from the lower press to section C and thence to section A and the upper delivery table.

The conveyer is of the usual parallel wire belt type. The section A comprises belts 3 and 4 running on respective free running pulleys on shafts 5 and 6, and on pulleys fixed on shafts 33 and 34 by which they are driven. The section B comprises belts 7 and 8 running on respective free running pulleys on shafts 9 and 10 and on pulleys fixed on shafts 35 and 36 being driven from said fixed pulleys. The section C comprises two sets of belts, one set 11 and 12 running on pulleys free on shafts 13 and 15, and pulleys fixed on shafts 14 and 16 and the other set 17 and 18 running on pulleys free on shafts 19 and 20, and on pulleys fixed on shafts 14 and 16. These belts 11, 12, 17 and 18 are driven from pulleys 14 and 16.

The supply belts 1 and 2 run on respective pulleys 21 and 22. For assisting the conveyance of the papers from the supply belts 1 to the point between the sections A and C intermediate belts 23 are provided running between pulleys fixed on shaft 6 and a wood roller 24. Similar belts 25 run between pulleys fixed on shaft 20 (by which they are driven) and a wood roller 26 for assisting the conveyance of the papers from the supply belt 2 to the point between the sections B and C.

Diverter belts 27 run round pulleys fixed on shaft 5 and free on shaft 13 and pulleys 28 and 29, the latter pulleys being movable into any of the positions shown in Figures 1

1, 3 and 5. Similar diverter belts 30 run round pulleys fixed on shaft 9 and free on shaft 19 and movable pulleys 31 and 32.

Mounted coaxially with the shafts 6, 15, 20 and 10 are four gear wheels 6a, 15a, 20a and 10a and four chain wheels 6b, 15b, 20b and 10b. The wheels 6a and 15a and also 20a and 10a are in mesh as shown. Chain wheel clutches are provided whereby said chain wheels may be released from or coupled to the gear wheels as desired, said gear wheels and shafts being in permanent rigid relation.

Two further gear wheels 5a and 9a are provided which are mounted coaxially and rigidly with the respective shafts 5 and 9 and are normally in mesh with the wheels 6a and 10a. The wheel 5a however may be pulled out of mesh with the wheel 6a and the wheel 9a may be pulled out of mesh with the wheel 10a.

Two further chain wheels 5b and 9b are also provided coaxial with the shafts 5 and 9 and adapted to be clutched to or released from said shafts 5 and 9 and gear wheels 5a and 9a when the latter are in the coaxial position therewith.

Combined chain and gear wheels 33ab, 34ab, 14ab, 16ab, 35ab and 36ab are provided in coaxial rigid relation with the shafts 33, 34, 14, 16, 35 and 36, and the several chain wheels are connected up by means of chains as shown.

The gear wheel 15a is kept permanently in rotation in the direction indicated by the arrow by means of the chain 37 (which drives directly onto said gear wheel at the back and not on to the chain wheel as appears from the drawing). In like manner the gear wheel 10a is kept unidirectionally rotating by means of the chain 38.

The numerals 39 and 40 designate polished metal guides hereinafter termed gliders. They are movable from a normal inoperative position indicated in dotted lines to the operative position shown in full lines.

In the following description of the operation of the device the clutches and pulleys will be designated by the same numerals as the corresponding shafts to which they appertain.

When it is desired to convey from the upper press to the upper delivery table and from the lower press to the lower delivery table, the clutches 6 and 10 are engaged and the clutches 5, 9, 15 and 20 are disengaged, and the diverters are operated to the position shown in Figure 1.

The gear wheels 10a, 9a, 20a, 15a, 6a, 5a are positively driven in the direction shown by the arrows. The clutch 6 being engaged, the chain wheel 6b is also positively driven as shown and from this the chain gear wheels 34ab and 33ab are driven as shown. The pulleys 33, 34 and fixed pulleys 6 are therefore positively driven and drive belts 3, 4 and 23 respectively for conveying the papers upwards. The belts 3 and 4 run on the free pulleys 5 and 6 but the diverter 27 will be driven by the fixed pulleys 5 these fixed pulleys 5 being driven by pull-out gear 5a in mesh with gear 6a.

It is therefore clear that the section A will operate for conveying papers from the belt 1 upwards to the upper delivery table.

In like manner the clutch 10 being engaged, the chain wheel 10b and therefore the chain gear wheels 36ab and 35ab will be positively driven as shown. The pulleys 25, 36 and hence belts 7 and 8 are therefore positively driven in the direction shown so that the section B conveys downwardly in like manner as the section A upwardly.

As clutches 5, 15, 9 and 20 are disengaged, the chain wheels 5b, 15b, 9b and 20b are not positively driven and the section C is inoperative.

When it is desired to deliver from the top press to the bottom delivery table clutches 15, 10, 5 and 9 are engaged and clutches 6 and 20 are disengaged, pull-out gear wheel 5a is out of mesh with gear wheel 6a but pull-out gear wheel 9a meshes with 10a; the diverters are set as shown in Figure 3 and the glider 40 is set to the operative position. The gear wheels 15a, 6a, 10a, 20a, 9a; and the chain wheels 15b, 16ab, 20b, 10b, 36ab, 9b, 14ab, 5b will be driven in the directions shown. The pulleys 14, 16, 35 and 36 will thus be positively driven in the direction shown and will drive belts 11, 12, 17, 18 and 7 and 8 respectively which run on the free running pulleys 13, 15, 19, 20, 9, 10. The fixed pulleys 9 and 5 drive the diverter belts in their correct directions and fixed pulleys 6 drive the belts 23; and it will be seen that papers will be conveyed from belt 1 down section C and down section B. Owing to clutch 6 being out the section A will be out of operation.

When it is desired to convey from the lower press to the upper delivery table clutches 5, 6, 9, 20 are engaged, clutches 15, 10 are disengaged, pull-out gear wheel 9a is out of mesh with gear wheel 10a, but pull-out gear wheel 5a meshes with 6a, glider 39 is set to its operative position and diverters 27 and 30 are operated to the position shown. It will now be seen that gear wheels 15a, 6a, 5a, 10a, 20a, and chain wheels 6b, 34ab, 33ab, 5b, 14ab, 9b, 20b, 16ab, 15b will be driven as shown. The pulleys 14, 16, 33 and 34 are positively driven in the direction of the arrows and will drive belts 17, 18, 11, 12, and 3 and 4 respectively. Fixed pulleys 5 and 9 drive the diverter belts 27 and 30 and fixed pulleys 20 drive the belt 25; and the conveyer will be set as shown for conveying papers from belt 2 up section C and up section A. The clutch 10 being out, section B will not be in operation.

What I claim and desire to secure by Letters Patent is:—

1. In a conveyer system, in combination, a plurality of independently operable conveyer sections, a supply source associated with each of said conveyer sections, an intermediate conveyer section, and means for rendering said intermediate conveyer section operable to deliver articles from one of said sources to the conveyer section associated with another of said sources.

2. In a conveyer system, in combination, two independently operable conveyer sections, a supply source associated with each of said conveyor sections, an intermediate conveyer section, and means for rendering said intermediate conveyer section operable to deliver articles from either of said sources to the conveyer section associated with the other of said sources.

3. In a belt conveyer system, the combination with two sources of supply, of a belt conveyer section associated with each of said sources and belt conveying means for delivering articles from either of said sources to the belt conveyer section associated with the other of said sources.

4. In a belt conveyer system, the combination with two sources of supply, of a belt conveyer section associated with each of said sources, an intermediate belt conveyer section and means for supplying articles from said sources to their respective conveyer sections simultaneously or for supplying articles from either of said sources through said intermediate conveyer section to the conveyer section associated with the other of said sources.

5. In a belt conveyer system, the combination with two end conveyer sections and an intermediate conveyer section located between the receiving ends of said end conveyer sections, of separate sources of supply associated with said end conveyer sections and a deflector device associated with each of said sources, each of said devices being adjustable to divert articles from its associated source into the end conveyer section associated with such source or into said intermediate conveyer section and each of said devices being also adjustable to divert articles from said intermediate conveyer section into its associated end conveyer section.

6. In a belt conveyer system, the combination with two end conveyer sections and an intermediate conveyer section located between the receiving ends of said end conveyer sections, of separate sources of supply located at opposite ends of said intermediate conveyer section, and deflector devices associated with said conveyer sections which are adjustable to supply articles from either of said sources to the receiving end of either of said end conveyer sections.

7. In a belt conveyer system, the combination with two end conveyer sections and an intermediate conveyer section located between the receiving ends of said end conveyer sections, of separate sources of supply associated with the receiving ends of said end conveyer sections and deflector means associated with said conveyers adapted to be adjusted to supply articles from said sources to their associated end conveyer sections simultaneously or to supply articles from either source to said intermediate section for delivery to the end conveyer associated with the other of said sources.

8. In a belt conveyer system, the combination with a plurality of conveyer sections and supply sources corresponding to such sections, of an intermediate conveyer section and a deflector device associated with each of said former conveyer sections, each of said devices being adjustable to divert articles to its associated conveyer section from the source corresponding to such section or from such source to said intermediate conveyer section, each of said devices being also adjustable to divert articles to its associated conveyer section from said intermediate conveyer section.

9. In a belt conveyer system, the combination with a pair of end conveyer sections each to be driven in one direction, a power driven feeding device associated with the receiving end of each of said end conveyer sections, an intermediate conveyer section and driving means for said conveyer sections including driving parts which are adjustable to provide for operation of each of said end conveyer sections by its associated feeding device or for operation of either of said end conveyer sections and said intermediate conveyer section by the feeding device associated with the other of said end conveyer sections.

In witness whereof I affix my signature.
HAROLD HERBERT RAPLEY.